(12) United States Patent
Zhan et al.

(10) Patent No.: US 12,277,015 B2
(45) Date of Patent: Apr. 15, 2025

(54) POWER SUPPLY DEVICE AND DUAL POWER SOURCE PLANES, AND SERVER

(71) Applicant: INSPUR SUZHOU INTELLIGENT TECHNOLOGY CO., LTD., Jiangsu (CN)

(72) Inventors: Jianping Zhan, Jiangsu (CN); Yunwu Peng, Jiangsu (CN); Kaixin Song, Jiangsu (CN)

(73) Assignee: INSPUR SUZHOU INTELLIGENT TECHNOLOGY CO., LTD., Jiangsu (CN)

(*) Notice: Subject to any disclaimer, the term of this patent is extended or adjusted under 35 U.S.C. 154(b) by 0 days.

(21) Appl. No.: 18/271,614

(22) PCT Filed: Oct. 29, 2021

(86) PCT No.: PCT/CN2021/127405
§ 371 (c)(1),
(2) Date: Jul. 10, 2023

(87) PCT Pub. No.: WO2023/279592
PCT Pub. Date: Jan. 12, 2023

(65) Prior Publication Data
US 2024/0069611 A1    Feb. 29, 2024

(30) Foreign Application Priority Data
Jul. 7, 2021 (CN) .......................... 202110764719.2

(51) Int. Cl.
*G06F 1/18* (2006.01)
*G06F 1/30* (2006.01)

(52) U.S. Cl.
CPC ............... *G06F 1/189* (2013.01); *G06F 1/30* (2013.01)

(58) Field of Classification Search
CPC .................................. G06F 1/189; H02J 9/062
(Continued)

(56) References Cited

U.S. PATENT DOCUMENTS 5,289,364 A * 2/1994 Sakurai ................... H02M 1/14
                                                    323/267
5,473,528 A * 12/1995 Hirata ..................... H02J 9/062
                                                    363/71
(Continued)

FOREIGN PATENT DOCUMENTS

CN      108121429 A     6/2018
CN      210776571 U     6/2020
(Continued)

OTHER PUBLICATIONS

International Search Report for PCT/CN2021/127405 mailed on Feb. 28, 2022 (6 pages including English Translation).
(Continued)

*Primary Examiner* — Paul R. Myers
(74) *Attorney, Agent, or Firm* — Merchant & Gould P.C.

(57) ABSTRACT

A power supply device with dual power source planes and a server. The device includes: a plurality of controllers connected in parallel; a first Power Supply Unit (PSU) power source group and a second PSU power source group each includes two PSU power sources connected in parallel, and the first PSU power source group and the second PSU power source group are respectively located on two independent power source planes; and a power source backboard, wherein the power source backboard includes a first copper skin layer and a second copper skin layer, which are not connected with each other, the first PSU power source group is connected to the input end of each controller by means of the first copper skin layer, and the second PSU
(Continued)

power source group is connected to the input end of each controller by means of the second copper skin layer.

16 Claims, 2 Drawing Sheets

(58) Field of Classification Search
USPC .......................................................... 713/300
See application file for complete search history.

(56) References Cited

U.S. PATENT DOCUMENTS

| | | | | |
|---|---|---|---|---|
| 5,488,531 | A * | 1/1996 | Aldridge | H02J 1/001 361/18 |
| 5,861,684 | A * | 1/1999 | Slade | H02J 1/06 307/66 |
| 6,677,687 | B2 * | 1/2004 | Ho | G06F 1/189 307/43 |
| 10,355,484 | B2 * | 7/2019 | Youn | H02J 1/102 |
| 10,658,820 | B2 * | 5/2020 | Xia | G06F 1/189 |
| 2003/0112647 | A1 * | 6/2003 | Liu | H02M 3/158 363/144 |
| 2005/0172157 | A1 * | 8/2005 | Artman | G06F 1/30 713/300 |
| 2006/0212266 | A1 * | 9/2006 | Chen | G01R 31/2803 702/182 |
| 2006/0220464 | A1 * | 10/2006 | Hanahan | H02J 1/10 307/64 |
| 2009/0164806 | A1 * | 6/2009 | Dishman | G06F 1/26 713/300 |
| 2012/0166825 | A1 * | 6/2012 | Blackburn | G06F 1/3203 713/310 |
| 2013/0026832 | A1 * | 1/2013 | Lee | H02J 1/10 307/43 |
| 2013/0054949 | A1 * | 2/2013 | Berke | G11C 5/04 713/2 |
| 2013/0138980 | A1 * | 5/2013 | Wang | H04L 12/12 713/300 |
| 2014/0019781 | A1 * | 1/2014 | Li | G06F 1/28 713/300 |
| 2015/0008746 | A1 | 1/2015 | Youn et al. | |
| 2015/0288178 | A1 * | 10/2015 | Gurlahosur | H02J 1/102 307/75 |
| 2016/0062433 | A1 * | 3/2016 | York | G06F 1/266 713/310 |
| 2017/0060714 | A1 * | 3/2017 | Han | G06F 1/30 |
| 2018/0307288 | A1 * | 10/2018 | Huang | G06F 1/3203 |
| 2021/0263543 | A1 * | 8/2021 | Wilson | G05F 1/46 |
| 2021/0303059 | A1 * | 9/2021 | Wang | G06F 1/3278 |
| 2022/0271560 | A1 * | 8/2022 | Mitani | H02J 1/086 |

FOREIGN PATENT DOCUMENTS

| | | |
|---|---|---|
| CN | 210776573 U | 6/2020 |
| CN | 111488049 A | 8/2020 |
| CN | 113238644 A | 8/2021 |

OTHER PUBLICATIONS

Written Opinion for PCT/CN2021/127405 mailed on Feb. 28, 2022 (4 pages).
Chinese Search Report for Application No. 2021107647192 dated Aug. 12, 2021 (2 pages).
Chinese Search Report for Application No. 2021107647192 dated Sep. 9, 2021 (2 pages).

* cited by examiner

POWER SUPPLY DEVICE AND DUAL POWER SOURCE PLANES, AND SERVER

CROSS-REFERENCE TO RELATED APPLICATION

The present application is a National Stage Application of PCT International Application No. PCT/CN2021/127405 filed on Oct. 29, 2021, which claims the priority of Chinese Patent Application 202110764719.2, filed in the China Patent Office on Jul. 7, 2021, and entitled "Power Supply Device with Dual Power Source Planes, and Server", the entire contents of which are herein incorporated by reference.

TECHNICAL FIELD

The present disclosure relates to the technical field of power supply, and in particular to a power supply device with dual power source planes, and a server.

BACKGROUND

Although a Power Supply Unit (PSU) of a current storage product supplies power in a 1+1 redundancy mode, for an entire Alternating Current (AC) power system, no matter a PSU power source or a Battery Backup Unit (BBU) power source supplies power by means of a power source backboard, so that all power-consuming modules are powered on the power source backboard, and a fault, such as a short circuit, at any place results in unavailability of the entire power source, such that the entire device cannot work.

In addition, although a plurality of planes are implemented for a power supply plane of an AC power source of the storage product in the related art; there are defects in several aspects. FIG. 1 shows a schematic structural diagram of a power supply device using a 1+1 redundancy policy in the related art. Firstly, from the perspective of the power source backboard, there are four power source planes in total, that is, each PSU corresponds to one power source plane, resulting in more layers of the power source backboard and higher logic complexity, and the four planes need to be segmented independently; secondly, the PSU is a 2*(1+1) redundancy mode (i.e., two paths of 1+1 redundant power supply are utilized), that is, a PSU 0 and a PSU 1 form 1+1 redundancy to supply power to controllers 0 and 1, a PSU 2 and a PSU 3 form 1+1 redundancy to supply power to controllers 2 and 3, and from the perspective of the entire system, in respond to any PSU is faulty, two of the controllers lose the 1+1 redundancy, and one PSU supplies power, such that the reliability is reduced; and then, in respond to two PSUs work, one of the PSU 0 and the PSU 1 must be in place, and one of the PSU 2 and the PSU 3 must be in place, otherwise, two of the controllers cannot work, such that the availability is reduced, and accordingly, the power supply devices in the related art need to be improved urgently.

SUMMARY

According to an embodiment of the present disclosure, provided is a power supply device with dual power source planes, wherein the device includes:
a plurality of controllers connected in parallel;
a first PSU power source group and a second PSU power source group, wherein the first PSU power source group and the second PSU power source group each includes two PSU power sources connected in parallel, and the first PSU power source group and the second PSU power source group are respectively located on two independent power source planes; and
a power source backboard, wherein the power source backboard includes a first copper skin layer and a second copper skin layer, which are not connected with each other, the first PSU power source group is connected to the input end of each controller by means of the first copper skin layer, and the second PSU power source group is connected to the input end of each controller by means of the second copper skin layer; and
each controller is configured to combine the electric current from the first PSU power source group with the electric current from the second PSU power source group, respectively, and output the combined electric current.

In some embodiments, the device further includes a plurality of BBU power sources; and
the plurality of BBU power sources are in one-to-one correspondence with the plurality of controllers, and each controller is configured to combine the electric current from the first PSU power source group, the electric current from the second PSU power source group and the electric current from the BBU power source corresponding to the controller, and output the combined electric current.

In some embodiments, the device further includes a management board, and each controller is connected to the management board.

In some embodiments, the management board includes a first management board and a second management board, and the plurality of controllers connected in parallel include a first controller, a second controller, a third controller and a fourth controller;
the combined electric current of the first controller is combined with the combined electric current of the second controller again to obtain a first target combined electric current, the first target combined electric current is respectively output to the first management board and the second management board by means of the power source backboard; and
the combined electric current of the third controller is combined with the combined electric current of the fourth controller again to obtain a second target combined electric current, the second target combined electric current is respectively output to the first management board and the second management board by means of the power source backboard.

In some embodiments, each controller has several output ends, and each output end is connected with a device to be powered.

In some embodiments, each controller has fourteen output ends, and each output end corresponds to one Input/Output (IO) card to be powered.

In some embodiments, the first PSU power source group and the second PSU power source group both output alternating electric current.

In some embodiments, the power supply device with dual power source planes is used for storing a server.

According to an embodiment of the present disclosure, provided is a server, including a power supply device with dual power source planes, wherein the power supply device with dual power source planes including:
a plurality of controllers connected in parallel;

a first PSU power source group and a second PSU power source group, wherein the first PSU power source group and the second PSU power source group each includes two PSU power sources connected in parallel, and the first PSU power source group and the second PSU power source group are respectively located on two independent power source planes; and a power source backboard, wherein the power source backboard includes a first copper skin layer and a second copper skin layer, which are not connected with each other, the first PSU power source group is connected to the input end of each controller by means of the first copper skin layer, and the second PSU power source group is connected to the input end of each controller by means of the second copper skin layer; and each controller is configured to combine the electric current from the first PSU power source group with the electric current from the second PSU power source group, respectively, and output the combined electric current.

In some embodiments, the server further includes:

a plurality of BBU power sources; and the plurality of BBU power sources are in one-to-one correspondence with the plurality of controllers, and each controller is configured to combine the electric current from the first PSU power source group, the electric current from the second PSU power source group and the current from the BBU power source corresponding to the controller, and output the combined electric current.

BRIEF DESCRIPTION OF THE DRAWINGS

To illustrate technical solutions in the embodiments of the present disclosure or in the related art more clearly, a brief introduction on the drawings which are needed in the description of the embodiments or the prior art is given below. Apparently, the drawings in the description below are merely some of the embodiments of the present disclosure, and those ordinary skilled in the art may also obtain other embodiments according to these drawings without any creative effort.

BRIEF DESCRIPTION OF REFERENCE SIGNS

10: a plurality of controllers connected in parallel;
20: first PSU power source group;
30: second PSU power source group;
40: power source backboard;
41: first copper skin layer;
42: second copper skin layer.

Detailed Description of the Embodiments

In order to make the objectives, technical solutions and advantages of the present disclosure more clearly understood, the embodiments of the present disclosure are further described in detail below in combination with specific embodiments and with reference to the drawings.

It should be noted that, all expressions using "first" and "second" in the embodiments of the present disclosure are to distinguish two different entities with the same name or different parameters, therefore "first" and "second" are for the convenience of expression, and should not be construed as limitations to the embodiments of the present disclosure, which will not be repeatedly illustrated in subsequent embodiments.

Figure 1:
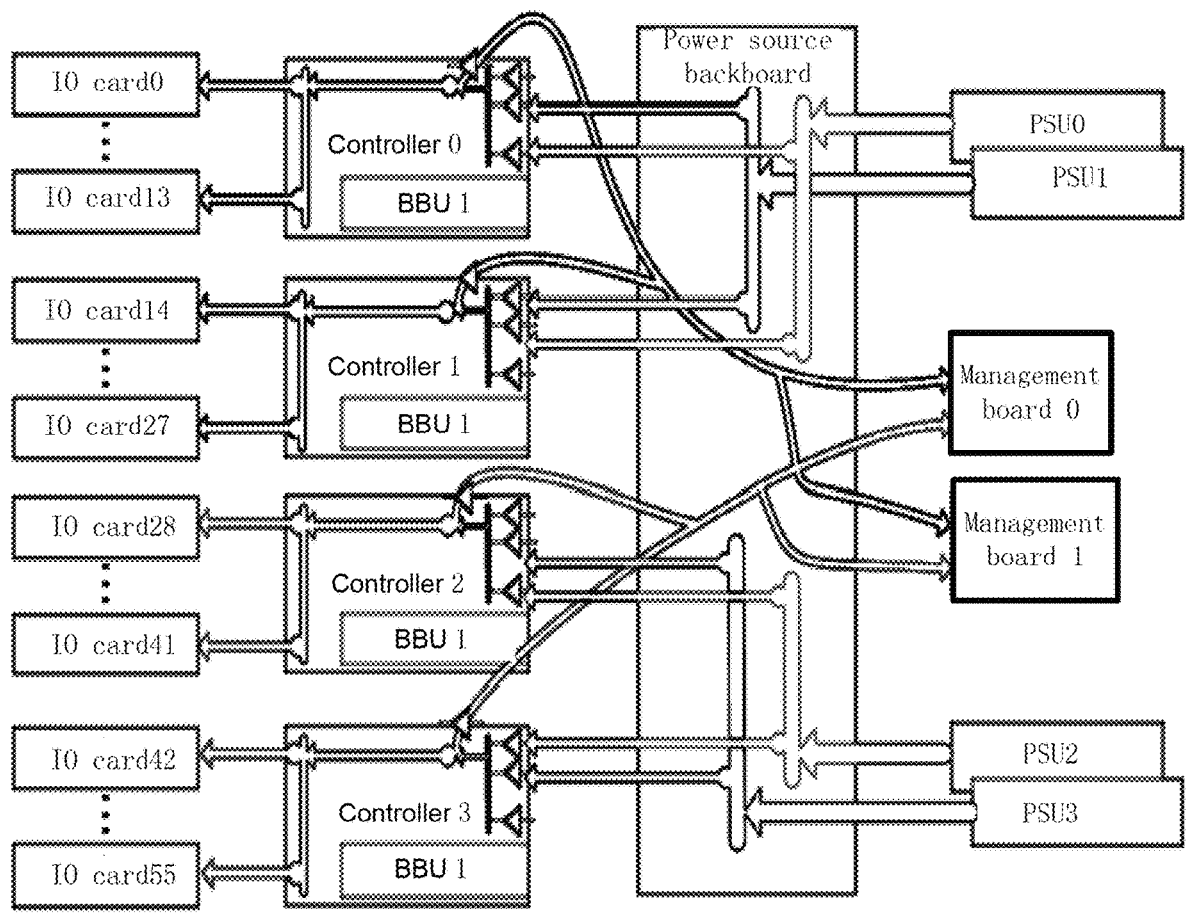
FIG. 1 is a schematic structural diagram of a power supply device using a 1+1 redundancy policy in the related art.
Figure 2:
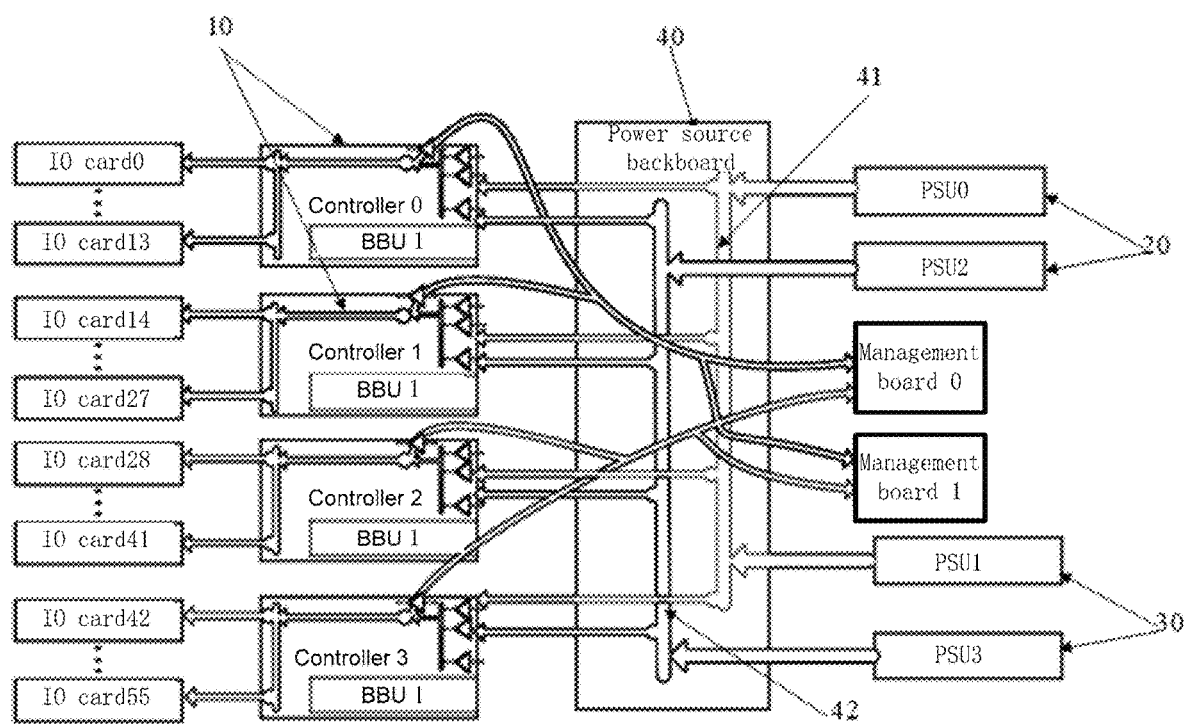
FIG. 2 is a schematic structural diagram of a power supply device with dual power source planes provided in an embodiment of the present disclosure.

In some embodiments, please refer to FIG. 2, the present disclosure provides a power supply device with dual power source planes, wherein the device includes:

a plurality of controllers 10 connected in parallel;

a first PSU power source group 20 and a second PSU power source group 30, wherein the first PSU power source group 20 and the second PSU power source group 30 each includes two PSU power sources connected in parallel, and the first PSU power source group 20 and the second PSU power source group 30 are respectively located on two independent power source planes; and a power source backboard 40, wherein the power source backboard 40 includes a first copper skin layer 41 and a second copper skin layer 42, which are not connected with each other, the first PSU power source group 20 is connected to the input end of each controller by means of the first copper skin layer 41, and the second PSU power source group 30 is connected to the input end of each controller by means of the second copper skin layer 42; and each controller is configured to combine the electric current from the first PSU power source group 20 with the electric current from the second PSU power source group 30, respectively, and output the combined electric current.

According to the power supply device with dual power source planes, on one hand, two power source planes are occupied on the power source backboard, each power source plane supplies power to four controllers, the two planes are combined in the controllers, thereby realizing redundant power supply of the power source planes, and meanwhile reducing the complexity of power source segmentation layers of the power source backboard; and on the other hand, in respond to four PSUs implement 2+2 redundancy but there are not four PSUs, there is no position requirement for the PSU, that is, in respond to any PSU is faulty, the normal work of the system is not affected, and in respond to any two PSUs are faulty, the normal work of the system is not affected neither, such that the reliability and stability of the power supply device are significantly improved.

In some embodiments, please refer again to FIG. 2, the device of the present disclosure further includes a plurality of BBU power sources; and the plurality of BBU power sources are in one-to-one correspondence with the plurality of controllers, and each controller is configured to combine the electric current from the first PSU power source group 20, the electric current from the second PSU power source group 30 and the electric current from the BBU power source corresponding to the controller, and output the combined electric current.

In some embodiments, the device of the present disclosure further includes a management board, and each controller is connected to the management board.

In some embodiments, the management board includes a first management board and a second management board, and the plurality of controllers 10 connected in parallel include a first controller, a second controller, a third controller and a fourth controller; as shown in FIG. 2, the first management board and the second management board are respectively denoted as a management board 0 and a management board 1, and the four controllers are respectively denoted as a controller 0 to a controller 4;

the combined electric current of the first controller is combined with the combined electric current of the second controller again to obtain a first target combined electric current, the first target combined electric current is respectively output to the first management board and the second management board by means of the power source backboard 40; and the combined electric current of the third controller is combined with the combined electric current of the fourth controller again to obtain a second target combined electric current, the second target combined electric current is respectively output to the first management board and the second management board by means of the power source backboard 40.

Please refer to FIG. 2, after the combined electric current of the controller 0 is combined with the combined electric current of the controller 1 again, the combined electric current is respectively output to the management board 0 and the management board 1 for management, and after the combined electric current of the controller 2 is combined with the combined electric current of the controller 3 again, the combined electric current is respectively output to the management board 0 and the management board 1 for management. Therefore, a redundancy mode is also utilized for the management boards in the present embodiment, and in respond to any management board is faulty, the normal work of the device is not affected, thereby greatly improving the management efficiency, the stability and the reliability of the power supply device.

In some embodiments, each controller has several output ends, and each output end is connected with a device to be powered.

In some embodiments, each controller has fourteen output ends, and each output end corresponds to one IO card to be powered, wherein the IO card may be a network card, a Riser card, and the like.

In some embodiments, the first PSU power source group 20 and the second PSU power source group 30 both output alternating electric current.

In some embodiments, the power supply device with dual power source planes is used for storing a server.

In some embodiments, in order to conveniently understand the solutions of the present disclosure, a power supply device used in a certain storage product is taken as an example for description, the power supply device includes: four controllers connected in parallel, that is, a controller 0 to a controller 4, and four PSU power sources are denoted as a PSU 0, a PSU 1, a PSU 2 and a PSU 3; and (1) the power source plane of the storage product is segmented into two independent planes (which are denoted as a power source plane 1 and a power source plane 2) in an AC power source plane segmentation mode, wherein the PSU 0 and the PSU 1 form the power source plane 1, the PSU 2 and the PSU 3 form the power source plane 2, the power source plane 1 and the power source plane 2 both supply power to each controller, that is, the PSU 0 and the PSU 2 respectively supply power to the controller 0, the controller 1, the controller 2 and the controller 3 after being combined, and the PSU 1 and the PSU 3 respectively supply power to the controller 0, the controller 1, the controller 2 and the controller 3 after being combined.

(2) The power source plane 1 and the power source plane 2 are respectively combined in each controller, and in respond to one power source plane has a short circuit or other faults, the normal power supply function of the other plane is not affected, thereby realizing redundancy of the power source planes.

For example, it is assumed that the PSU 0 and the PSU 1 are both damaged, then, at this time, the PSU 2 and the PUS 3 may supply power to the four controllers and the IO cards connected thereto; and it is assumed that the PSU 0 and the PSU 1 or any two PSUs are damaged, the power supply to the IO card is not affected. According to the power supply device with dual power source planes of the present application, firstly, the power source plane of the storage product is segmented into two independent planes in the AC power source plane segmentation mode, wherein the PSU 0 and the PSU 1 form the power source plane 1, the PSU 2 and the PSU 3 form the power source plane 2, and the power source plane 1 and the power source plane 2 both supply power to each controller. The two power source planes are combined in the controller, and in respond to one power source plane has a short circuit or other faults, the normal power supply function of the other plane is not affected, thereby realizing redundancy of the power source planes, and meanwhile reducing the power source segmentation of the power source backboard 40, such that the reliability is higher. Secondly, any two PSUs have enough power supply capability to support the entire system to work, regardless of whether the two PSUs are on the same power source plane or different power source planes, such that the use is more flexible, and the availability is higher. The power supply device with dual power source planes of the present application has several advantages:

First, by means of AC power source plane segmentation, each powered device is independently powered by two independent planes, therefore in respond to one plane is faulty, the normal power supply function of the other plane is not affected.

Second, by means of 2+2 redundancy of the PSU power supply module, in respond to any two PSUs are faulty (the positions of the faulty PSUs are not limited), the normal work of the entire system is not affected, and the reliability of the 2+2 redundancy mode is higher than two 1+1 redundancy modes.

Third, the power source planes of the power source backboard 40 are reduced from previous four domains to two domains, thereby reducing the complexity of the power source backboard 40.

In some embodiments, the present disclosure provides a server, includes a power supply device with dual power source planes, wherein the power supply device with dual power source planes includes:

a plurality of controllers 10 connected in parallel;

a first PSU power source group 20 and a second PSU power source group 30, wherein the first PSU power source group 20 and the second PSU power source group 30 each includes two PSU power sources connected in parallel, and the first PSU power source group 20 and the second PSU power source group 30 are respectively located on two independent power source planes; and a power source backboard 40, wherein the power source backboard 40 includes a first copper skin layer 41 and a second copper skin layer 42, which are not connected with each other, the first PSU power source group 20 is connected to the input end of each controller by means of the first copper skin layer 41, and the second PSU power source group 30 is connected to the input end of each controller by means of the second copper skin layer 42; and each controller is configured to combine the electric current from the first PSU power source group 20 with the electric current from the second PSU power source group 30, respectively, and output the combined electric current.

According to the server, on one hand, two power source planes are occupied on the power source backboard 40, each power source plane supplies power to four controllers, the two planes are combined in the controllers, thereby realizing redundant power supply of the power source planes, and meanwhile reducing the complexity of power source segmentation layers of the power source backboard 40; and on the other hand, in respond to four PSUs implement 2+2 redundancy but there are not four PSUs, there is no position requirement for the faulty PSU, that is, in respond to any PSU is faulty, the normal work of the system is not affected, and in respond to any two PSUs are faulty, the normal work of the system is not affected neither, such that the reliability and stability of the power supply device are significantly improved.

In some embodiments, the server further includes:
a plurality of BBU power sources; and
the plurality of BBU power sources are in one-to-one correspondence with the plurality of controllers, and each controller is configured to combine the electric current from the first PSU power source group 20, the electric current from the second PSU power source group 30 and the electric current from the BBU power source corresponding to the controller, and output the combined electric current.

In some embodiments, the server further includes a management board, and each controller is connected to the management board.

In some embodiments, the management board includes a first management board and a second management board, and the plurality of controllers 10 connected in parallel include a first controller, a second controller, a third controller and a fourth controller;
the combined electric current of the first controller is combined with the combined electric current of the second controller again, obtain a first target combined electric current, the first target combined electric current is respectively output to the first management board and the second management board by means of the power source backboard 40; and
the combined electric current of the third controller is combined with the combined electric current of the fourth controller again, obtain a second target combined electric current, the second target combined electric current is respectively output to the first management board and the second management board by means of the power source backboard 40.

In some embodiments, each controller has several output ends, and each output end is connected with a device to be powered.

In some embodiments, each controller has fourteen output ends, and each output end corresponds to one IO card to be powered.

In some embodiments, the first PSU power source group 20 and the second PSU power source group 30 both output alternating electric current.

The above descriptions are exemplary embodiments disclosed in the present disclosure, but it should be noted that, various changes and modifications may be made without departing from the scope disclosed in the embodiments of the present disclosure as defined in the claims. In addition, although elements disclosed in the embodiments of the present disclosure may be described or claimed in an individual form, it can be understood that there are a plurality of elements, unless explicitly limited to be singular.

It should be understood that, as used herein, a singular form "a" is also intended to include a plural form as well, unless the context clearly supports exceptional cases. It should also be understood that, the term "and/or" as used herein refers to any and all possible combinations which include one or more items listed in association.

The sequence numbers of the embodiments disclosed in the embodiments of the present disclosure are merely for description, but do not represent the advantages and disadvantages of the embodiments.

Those ordinary skilled in the art to which the present disclosure belongs should understand that, the discussion of any of the above embodiments is merely exemplary, and is not intended to imply that the scope (including the claims) disclosed in the embodiments of the present disclosure is limited to these examples; under the idea of the embodiments of the present disclosure, the technical features in the above embodiments or different embodiments may also be combined, and there are many other changes in different aspects of the embodiments of the present disclosure as described above, which are not provided in details for conciseness. Therefore, any omissions, modifications, equivalent replacements, improvements and the like, made within the spirit and principles of the embodiments of the present disclosure, should fall within the protection scope of the embodiments of the present disclosure.

The invention claimed is:

1. A power supply device with dual power source planes, comprising:
a plurality of controllers connected in parallel;
a first Power Supply Unit (PSU) power source group and a second Power Supply Unit (PSU) power source group, wherein the first Power Supply Unit (PSU) power source group and the second Power Supply Unit (PSU) power source group each comprises two Power Supply Unit (PSU) power sources connected in parallel, and the first Power Supply Unit (PSU) power source group and the second Power Supply Unit (PSU) power source group are respectively located on two independent power source planes; and
a power source backboard, wherein the power source backboard comprises a first copper skin layer and a second copper skin layer, which are not connected with each other, the first Power Supply Unit (PSU) power source group is connected to the input end of each controller by means of the first copper skin layer, and the second Power Supply Unit (PSU) power source group is connected to the input end of each controller by means of the second copper skin layer; and
each controller is configured to combine the electric current from the first Power Supply Unit (PSU) power source group with the electric current from the second Power Supply Unit (PSU) power source group, respectively, and output the combined electric current;
wherein the power supply device further comprises a management board, each controller is connected to the management board;
wherein the management board comprises a first management board and a second management board, and the plurality of controllers connected in parallel comprise a first controller, a second controller, a third controller and a fourth controller;
the combined electric current of the first controller is combined with the combined electric current of the second controller again to obtain a first target combined electric current, the first target combined electric current is respectively output to the first management board and the second management board by means of the power source backboard; and the combined electric current of the third controller is combined with the combined electric current of the fourth controller again to obtain a second target combined electric current, the second target combined electric current is respectively output to the first management board and the second management board by means of the power source backboard.

2. The power supply device with dual power source planes as claimed in claim 1, further comprising a plurality of BBU (Battery Backup Unit) power sources, wherein, the plurality of BBU (Battery Backup Unit) power sources are in one-to-one correspondence with the plurality of controllers, and each controller is configured to combine the electric current from the first Power Supply Unit (PSU) power source group, the electric current from the second Power Supply Unit (PSU) power source group and the electric current from the BBU (Battery Backup Unit) power source corresponding to the controller, and output the combined electric current.

3. The power supply device with dual power source planes as claimed in claim 1, wherein each controller has several output ends, and each output end is connected with a device to be powered.

4. The power supply device with dual power source planes as claimed in claim 3, wherein each controller has fourteen output ends, and each output end corresponds to one Input/Output (IO) card to be powered.

5. The power supply device with dual power source planes as claimed in claim 4, the Input/Output (IO) card comprises: a network card or a Riser card.

6. The power supply device with dual power source planes as claimed in claim 1, the two independent power source planes are segmented in the AC power source plane segmentation mode.

7. The power supply device with dual power source planes as claimed in claim 1, any two Power Supply Unit (PSU) power sources may support the entire system to work.

8. The power supply device with dual power source planes as claimed in claim 1, wherein the first Power Supply Unit (PSU) power source group and the second Power Supply Unit (PSU) power source group both output alternating electric current.

9. The power supply device with dual power source planes as claimed in claim 1, wherein the power supply device with dual power source planes is used for storing a server.

10. A server, comprising a power supply device with dual power source planes, wherein the power supply device with dual power source planes comprising:

a plurality of controllers connected in parallel;

a first Power Supply Unit (PSU) power source group and a second Power Supply Unit (PSU) power source group, wherein the first Power Supply Unit (PSU) power source group and the second Power Supply Unit (PSU) power source group each comprises two Power Supply Unit (PSU) power sources connected in parallel, and the first Power Supply Unit (PSU) power source group and the second Power Supply Unit (PSU) power source group are respectively located on two independent power source planes; and a power source backboard, wherein the power source backboard comprises a first copper skin layer and a second copper skin layer, which are not connected with each other, the first Power Supply Unit (PSU) power source group is connected to the input end of each controller by means of the first copper skin layer, and the second Power Supply Unit (PSU) power source group is connected to the input end of each controller by means of the second copper skin layer; and each controller is configured to combine the electric current from the first Power Supply Unit (PSU) power source group with the electric current from the second Power Supply Unit (PSU) power source group, respectively, and output the combined electric current;

wherein the server further comprises: a management board, wherein each controller is connected to the management board;

wherein the management board comprises a first management board and a second management board, and the plurality of controllers connected in parallel comprise a first controller, a second controller, a third controller and a fourth controller;

the combined electric current of the first controller is combined with the combined electric current of the second controller again, obtain a first target combined electric current, the first target combined electric current is respectively output to the first management board and the second management board by means of the power source backboard; and the combined electric current of the third controller is combined with the combined electric current of the fourth controller again, obtain a second target combined electric current, the second target combined electric current is respectively output to the first management board and the second management board by means of the power source backboard.

11. The server as claimed in claim 10, wherein the server further comprises:

a plurality of BBU (Battery Backup Unit) power sources; and the plurality of BBU (Battery Backup Unit) power sources are in one-to-one correspondence with the plurality of controllers, and each controller is configured to combine the electric current from the first Power Supply Unit (PSU) power source group, the electric current from the second Power Supply Unit (PSU) power source group and the electric current from the BBU (Battery Backup Unit) power source corresponding to the controller, and output the combined electric current.

12. The server as claimed in claim 10, wherein each controller has several output ends, and each output end is connected with a device to be powered.

13. The server as claimed in claim 12, wherein each controller has fourteen output ends, and each output end corresponds to one Input/Output (IO) card to be powered.

14. The server as claimed in claim 10, wherein the first Power Supply Unit (PSU) power source group and the second Power Supply Unit (PSU) power source group both output alternating electric current.

15. The server as claimed in claim 13, the Input/Output (IO) card comprises: a network card or a Riser card.

16. The server as claimed in claim 10, the two independent power source planes are segmented in the AC power source plane segmentation mode.

* * * * *